United States Patent [19]

Altenburger et al.

[11] 3,842,214

[45] Oct. 15, 1974

[54] PATH FINDING SYSTEM

[75] Inventors: Otto Altenburger, Rochester; Alton Dorazio, Jr., East Rochester, both of N.Y.

[73] Assignee: Stromberg-Carlson Corporation, Rochester, N.Y.

[22] Filed: Oct. 31, 1972

[21] Appl. No.: 302,458

[52] U.S. Cl. .......... 179/18 EA
[51] Int. Cl. .......... H04q 3/42
[58] Field of Search .......... 179/18 EA

[56] References Cited

UNITED STATES PATENTS

| | | | |
|---|---|---|---|
| 3,585,309 | 6/1971 | Gueldenpfennig | 179/18 EA |
| 3,599,235 | 8/1971 | Haigh | 179/18 EA |
| 3,729,591 | 4/1973 | Gueldenpfennig | 179/18 EA |

*Primary Examiner*—William C. Cooper
*Attorney, Agent, or Firm*—William F. Porter, Jr.; Charles C. Krawczyk

[57] ABSTRACT

A path finding system is disclosed for finding a free path between a single marked inlet on one side of a multistage switching network and a single one of one or more marked inlets on the other side independent of the marking arrangement for the other side.

31 Claims, 10 Drawing Figures

PATH FINDING SYSTEM

BACKGROUND OF THE INVENTION

This invention relates to path finding systems generally and specifically to a path finding system for finding a free path between a single marked inlet on one side of a multistage switching network and a single one of one or more marked inlets on the other side of the network via one of a plurality of links having a single unique path to each of the network inlets.

Multistage switching networks are common electrical devices for providing a multiplicity of electrical paths via different links between a group of inlets on one side of the network and a group of inlets on the other side of the network, one side being designated input and the other side output hereinafter only for convenience of identification. Like input circuits and like output circuits are connected to the input and output inlets respectively so that one of each may be interconnected by the network for the purpose of translating electrical signals therebetween for whatever period of time is required. Thereafter, the connection is released.

As defined in an IEEE paper entitled, "Electronic Controls For Reed Relay Space Divided Switching Matrices," written by Klaus Gueldenpfennig and Stanley L. Russell, which may be found in the 1972 International Switching Symposium Record at pages 333–342, full availability means that any input inlet of a multistage switching network has access or is connectable to any output inlet. One such type of network, with which the path finding system of the present invention is compatible, is disclosed in a copending application entitled, "Switching Network Using A Cable Arrangement," Ser. No. 302,459 filed jointly herewith on behalf of Alton Dorazio, Jr., Ramses R. Mina, and Sureshar L. Soni, and assigned to the assignee of the present application. The IEEE paper goes on to state that a network is said to be non-blocking when an input inlet having access to an output inlet is always connectable thereto irrespective of the network traffic (simultaneous connections between input and output inlets). In a non-blocking network having full availability it is only necessary to select, or as is commonly referred to, mark a single input and output inlet for inter-connection since by definition there will always be an available path therebetween to effect the interconnection. Most networks are designed with some degree of blocking, however, because of the substantial cost reduction over non-blocking designs, which in most cases are not required or warranted. Since in a blocking network it may not always be possible to find an available path between a single marked input and output inlet, the probability of blocking is sometimes reduced by marking more than one output inlet from which a single one having an available path to the marked input inlet is selected. In such an arrangement the group of marked output inlets is usually restricted so that the path finding system can automatically select a marked output inlet during the normal cause of the path finding operation. Although this simplifies the path finding procedure it creates problems with respect to the flexibility of the marking arrangement which becomes more pronounced as the network is expanded. It would therefore be desirable to provide a path finding system which will function properly whether one, some or all of the output inlets are marked prior to path finding.

Another factor which should be considered in any path finding system is the most effective and efficient utilization of equipment. To best utilize the scanning equipment of the path finding system, it should be used at maximum capacity at each and every stage of the network development. However, since the size of a growing network changes at each stage of development, this is possible only if the capacity of the scanning equipment is continuously modified as the network is expanded or if during each path finding operation the scanning equipment is directed to the same amount of equipment selected from the overall network equipment. The latter approach is the more desirable of the two because since the size of the scanners need not be expanded to accommodate network expansion, the complexity of scanning equipment remains constant and avoids modifications which might otherwise necessitate service interruptions during the expansion operation.

A third consideration in path finding is the reliable operation of the system in physically effecting a connection once a path has been found. This can be a problem in large multistage networks requiring a substantial amount of energy to complete the connection in that quite often all the switching devices in the network paths are operated in series from the same current. If the resistance of the path is large enough, a sufficient current may not be developed to operate one or more switching devices reliably.

With the foregoing in mind, it is a primary object of the present invention to provide a new and improved path finding system whose operation permits complete flexibility in the marking arrangement used for the inlets to one side of a multistage network.

It is a further object of the present invention to provide a new and improved path finding system whose scanning equipment is used at maximum capacity irrespective of the size of the network without the need for modifying the equipment whenever the network is expanded.

It is still a further object of the present invention to provide a new and improved path finding system which provides more than one current path for reliably effecting a network connection after a path has been found.

BRIEF DESCRIPTION OF THE INVENTION

The path finding system of the invention is compatible with a multistage switching network having a plurality of input inlets connectable to a plurality of output inlets thereof via a plurality of links, each link having a single unique path to each of the input and output inlets. In operation the path finding system effects a connection between a single marked input inlet and a single one of one or more marked output inlets via a single link.

The first step in the path finding operation is the identification of a link having an available path to the marked input inlet and to at least one of the marked output inlets. The second step in the path finding operation is then directed to selecting one of the marked output inlets having an available path to the identified link. Thereafter the connection is physically completed by applying an energizing potential to the marked input inlet and the selected output inlet via the identified link.

To permit the same scanning equipment to be used as the switching network is expanded from its initial stage to its ultimate development, the path finding system includes selector circuits which direct the various path finding scans to predetermined groups of equipment. The network is expanded each time by the addition of an input and output grid having input and output inlets respectively, which provides links for connecting each grid to one another as well as to existing input and output grids. All of the links are arranged in cables and the cables having links from the same input grid are scanned together during the first path finding step. The first step involves a first scan of the cables from an input grid having a marked inlet to identify a cable having a link with an available path to the marked input inlet and a link with an available path to at least one available marked output inlet. The second scan in the first step then identifies a link within the identified cable having both such available paths.

Each output grid is arranged in a plurality of modules, each having a single connection to one of a plurality of matrices which provide the output inlets. Each link is connected to only one module so that when a link is identified, its corresponding module can also be identified. The second step in the path finding operation is directed to identifying a matrix having at least one output inlet with an available path to the identified module and then selecting a single output inlet of the identified matrix having such an available path. The path finding system of the invention includes a numbering and grouping arrangement and cable identification leads for easily performing the two aforementioned scans.

Another feature of the invention is a recycle means for permitting the first scan of the first step in the path finding operation to be restarted in the event that a link having an available path to a marked input inlet as well as to at least one marked output inlet can not be found in the identified cable.

DETAILED DESCRIPTION OF THE PREFERRED EMBODIMENT OF THE INVENTION

Figure 1:
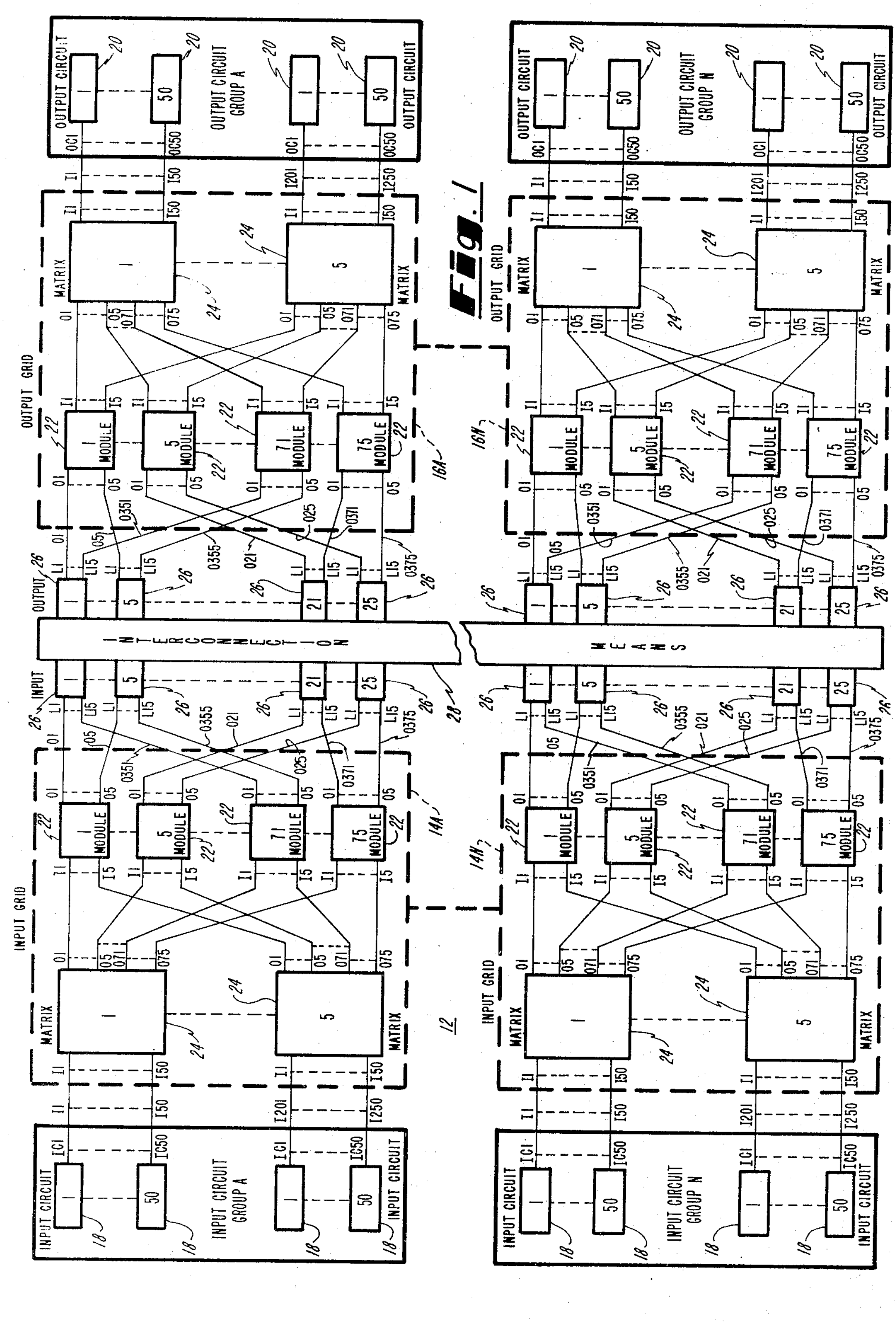
FIG. 1 is a diagram of a multistage switching network with which the path finding system of the invention is compatible.

FIG. 1 shows a specific embodiment of the type of switching network designated generally as 12 with which the path finding system of the invention is compatible. The switching network 12, which is described in detail in the aforementioned copending application, comprises a plurality of input grids 14 (A–N) and a plurality of output grids 16 (A–N) each having 250 inlets I (1–250) and 375 outlets O (1–375) with any one outlet O being connectable to any one of its associated inlets I via a single unique path through its respective grid. Each one of a plurality of input circuits 18 arranged in groups is connected to a different one of the 250 inlets I (1–250) of the input grid 14 while each one of a plurality of output circuits 20 arranged in groups is connected to a different one of the 250 inlets I (1–250) of the output grid 16. The path for connecting an outlet O with an inlet I of a grid is provided via one of 75 modules 22, each having five inlets I (1–5) and five outlets O (1–5) and one of five matrices 24, each having 50 inlets I (1–50) and 75 outlets O (1–75) with each inlet I to a matrix 24 and a module 22 being connectable to any one of its respective outputs O via a single unique path. Each of the 75 outlets O (1–75) from each matrix 24 is connected to an inlet I of a different one of the 75 modules 22 in its respective grid. The 375 outlets O (1–375) of each grid are taken from the five outlets O (1–5) of each of the 75 modules 22 within the grid and are arranged in 25 cable groups 26 of 15 outlets O each, with each outlet O of an input grid being connected to an outlet O of an output grid via a link L. To minimize blocking, each of the 15 links L (1–15) in a cable group 26 are connected to a different one of the 75 modules 22. Although the preferred embodiment shows the 15 links L (1–15) being taken from every fifth module 22, they can be taken from any 15 modules 22. The particular arrangement depicted was arrived at only because of power requirements not relevant to an understanding of the invention.

Each of the 25 cable groups 26 from an input grid 14, hereinafter referred to as input cables 26, is connected to an individual cable group 26 from an output grid 16, hereinafter referred to as an output cable 26, via the 15 links L (1–15) through an interconnection means 28. As explained in the aforementioned IEEE paper, in this type of system each link L might have to interconnect as many as four separate leads, two for passing the desired electrical signals after a network connection has been established, one, commonly referred to as a mark lead, for finding and establishing the connection and another referred to as a sleeve lead for holding the connection thereafter. Only one lead is shown in FIG. 1 for the sake of clarity. Each output grid 16 has at least one output cable 26 connected to an input cable 26 from each and every input grid 14 so that all input and output grids are interconnected to provide complete access from any one of the input circuits 18 to any one of the output circuits 20. Each interconnection of an input cable 26 with an output cable 26 via the interconnection means 28 provides 15 separate links L (1–15) for interconnecting the input circuits 18 of the input grid 14 to which the input cable 26 is connected with the output circuits 20 of the output grid 16 to which the output cable 26 is connected. From each link L there is a single unique path through the input grid 14 to any input circuit 18 associated therewith. Likewise, from each link L there is a single unique path through the output grid 16 to each output circuit 20 associated therewith. This characteristic of the network 12 is used in the path finding system of the invention which will now be described.

In normal operation only one of the input circuits 18 connected to any one of the input grids 14 and one or more of the output circuits 20 connected to the output grids 16 would be marked for establishing a particular connection, the marking being supplied by whatever system the input-output circuits are used in. For instance, in a telephone system the input circuits might be local junctors with an individual junctor being marked when seized by a telephone line circuit for establishing a telephone connection. The output circuits might be ringing control circuits, at least one of which would be marked by the number translator prior to completion of a telephone connection within the exchange or perhaps trunk circuits, at least one of which would be marked by a trunk marker in the case of a call to a distant exchange. Since there are at least 15 links L (1–15) provided for interconnecting any particular input circuit 18 with any particular output circuit 20, the first step in the path finding operation is directed to identifying a single free link, viz., a single idle link that has an available path to the marked input circuit 18 via the input grid 14 and an available path to at least one of the marked output circuits 20 via an output grid 16. If only one output circuit 20 is marked for connection to a single marked input circuit 18, nothing further is required in the path finding operation after the first step other than to actually establish the network path by energizing all of the switching devices in the mark lead which control the connection of an inlet with an associated outlet (commonly called a crosspoint) of each module in the free path found since there is only one unique path from each link L to any one input circuit 18 and output circuit 20. Consequently, only one set of crosspoints can be operated by applying an energizing potential to the inlets of the marked input and output circuits via the identified free link L. However, when more than one output circuit 20 is marked to reduce the probability of blocking, the path finding operation must be extended to a second step in order to select a single one of the marked output circuits 20 having an available path to the identified free link. Although each of these steps could be performed with one scanning operation as will become evident later, the preferred embodiment utilizes two scans for each step to permit the most effective and efficient utilization of the path finding equipment.

Figure 2:
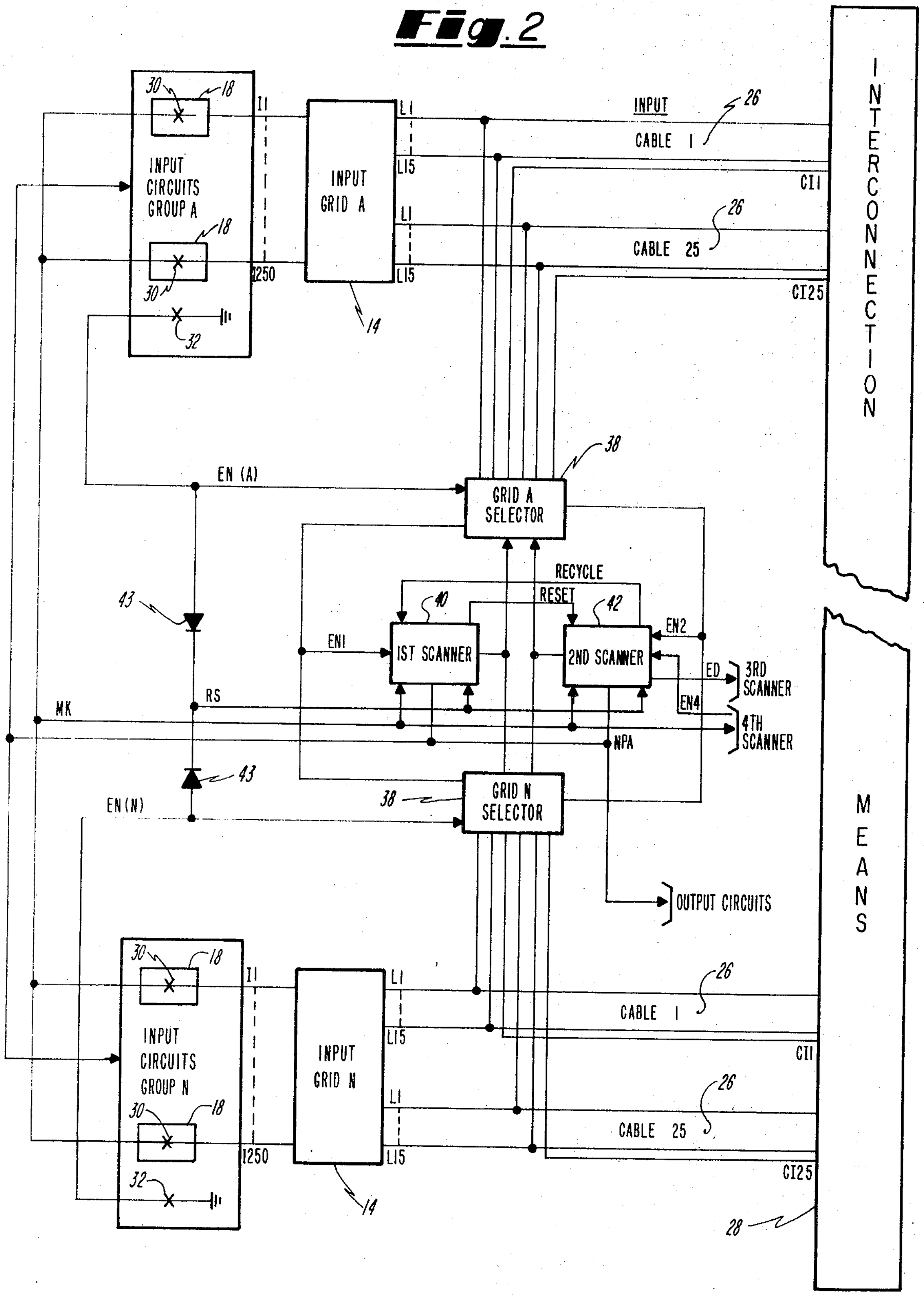
FIG. 2 is a block diagram of the path finding system equipment used during the first step in the path finding operation to identify a link.
Figure 3:
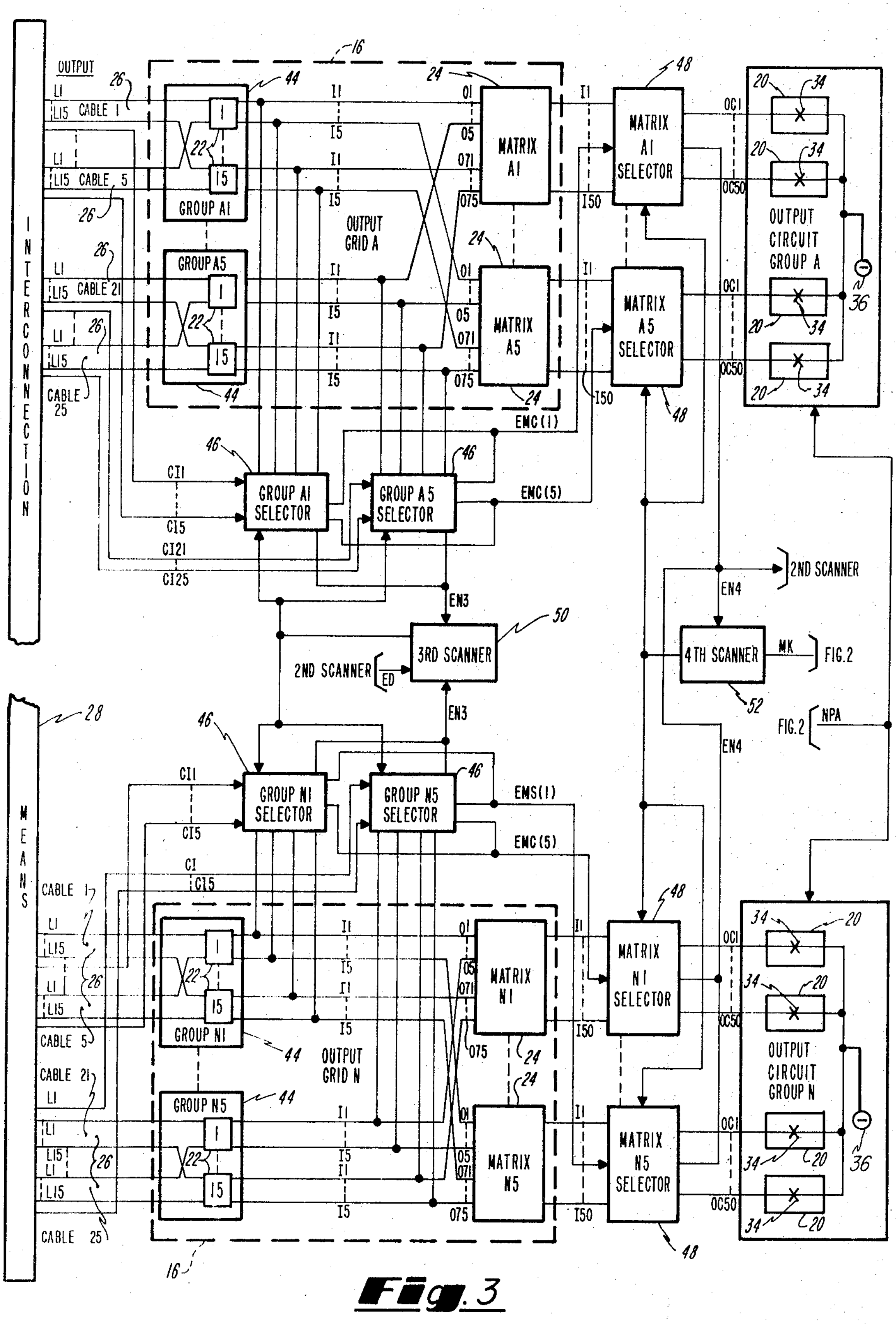
FIG. 3 is the path finding system equipment used during the second step of the path finding operation to select a single marked output inlet and to effectuate connection thereafter.

FIG. 2 shows the path finding equipment utilized during the first two scans to identify a free link L in the network 12 while FIG. 3 shows the path finding equipment utilized during the second two scans to select a single one of the marked output circuits 20. For simplification these figures show only the mark leads through the network 12 which are used for path finding purposes and it should be realized that associated with each one of these leads would be a pair of leads for translating the required electrical signals after a connection is made as well as perhaps a sleeve lead for holding the path after one is found.

The marking of an input circuit 18 causes two things to happen as shown in FIG. 2. First, the inlet I of the input grid 14 with which the marked input circuit 18 is associated, is connected to a lead MK by the closing of normally open contacts 30 located in the marked input circuit 18. The lead MK is used to identify a free link L having an available path through the input grid 14 to the marked input circuit 18. Since only one input circuit 18 can be marked at any one time for path finding and the path finding system of the invention permits only one interconnection to be established at a time, there will always be only one set of contacts 30 closed at any one time. The second thing to happen when an input circuit 18 is marked is the closing of normally open contacts 32 associated with the group in which the marked input circuit 18 is located to apply an enable signal EN represented as a ground herein to an enable lead EN( ) to initiate the path finding operation. The marking of any input circuit 18 within the same group will cause the normally open contacts 32 of that group to close.

As shown in FIG. 3, whenever one or more output circuits 20 are marked, normally open contacts 34 in each of the marked output circuits 20 are closed to connect the marked output circuits 20 to the negative terminal 36 of a DC supply which need not be shown since all DC supplies herein have their positive terminals connected to ground. The negative terminal 36 is used to identify a free link L having an available path through an output grid 16 to at least one of the marked output circuits 20 and is also used subsequently to select one of the marked output circuits 20 having such an available path to the free link L previously identified. At this time the leads OC (1–50) from the output circuits 20 are connected to their respective output grids 16 via the individual inlets I (1–50). It should be noted that the negative terminal 36 need not be connected directly to the output circuits 20 but can be connected thereto through some other switching network so that a path through the other switching network is automatically determined by the path found in the switching network 12. This, however, creates a greater load for operating the crosspoints. Using the telephone system again as an example, if the output circuits 20 were ringing circuits, then the negative terminal 36 would be connected thereto through a line link network to which the line circuit of the called telephone subscriber is connected. The crosspoints in the line link network would be operated in series with some of the crosspoints in the switching network 12 once a path through the network 12 had been found, thereby imposing a greater load than if these crosspoints had been operated separately. The present invention will be seen to overcome this problem which might otherwise affect the reliable operation of the crosspoints.

Returning to FIG. 2, it is seen that each input grid 14 has associated therewith a grid selector circuit 38 (the letter within the selector box indicating the input grid 14 with which it is associated) which is connected to its associated group of input circuits 18 by an individual enable lead EN ( ). Each grid selector circuit 38 is connected to a first scanner 40 and a second scanner 42. The first step in the path finding operation is broken into two separate scans to identify a free link L. The first scanner 40 scans the 25 input cables 26 associated with the input grid 14 connected to the marked input circuit 18 to identify an input cable 26 having a free link L therein and the second scanner 42 then scans the 15 links L (1–15) within the identified input cable 26 to identify a single free link L therein. When an input circuit 18 is marked, the enable signal EN generated by its associated group is applied via the lead EN ( ) to the grid selector circuit 38 associated with the input grid 14 to which the marked input circuit 18 is connected, to enable only that particular grid selector 38 to pass the scanning pulses generated by the first and second scanners 40 and 42. The enable signal EN is also applied through a diode 43 to a lead RS connected to the first and second scanners 40 and 42 to provide a reset signal RS to subsequently insure the proper programming of the scanners prior to each scanning operation.

When the enabled grid selector 38 responds to the enable signal EN applied thereto and is prepared to pass the scanning pulses, it applies an enable signal EN1 to the first scanner 40 to permit it to initiate the first scanning operation to find an input cable 26 having a free link L. The first scanner 40 generates 25 consecutive ground pulses which are applied sequentially to the 25 input cables 26 connected to the enabled grid selector 38. Each ground pulse is applied simultaneously to all 15 links L (1–15) in an input cable 26. It should be mentioned that the scanning rate for all scanners used herein is fast enough so that no relay in the scanning path can be operated by the scanning signal during scanning. The first scanner 40 identifies and stops at a particular input cable 26 in response to the coincident detection of two conditions, namely a ground detected on the MK lead which is connected thereto indicating that there is at least one link L in the identified cable 26 having an available path through the input grid 14 to the marked input circuit 18 through which the ground pulse was transmitted to the MK lead, and the detection of a current flow to the negative terminal 36 indicating at least one link L in the identified input cable 26 having an available path to at least one of the marked output circuits 20 through an output grid 16 through which the current must have passed. If an input cable 26 having a free link L cannot be found after the completion of a full scan of all 25 input cables 26, the first scanner 40 stops and applies a signal to a lead NPA (no path available) to force the marked input and output circuits to release since a connection therebetween is not possible at this time. Once the first scanner 40 identifies an input cable 26 having a free link therein its ground is removed and the enabled grid selector 38 applies an enable signal EN2 to the second scanner 42 to initiate the second scan by ground pulses for a single free link L within the identified cable 26. The links L (1–15) are now scanned individually. The coincident detection of a ground on the MK lead connected to the second scanner 42 together with a current flow to the negative terminal 36 stops the second scanner 42 at an identified free link L the same as the first scanner 40 was stopped at the identified input cable 26.

Since all 15 links L (1–15) in an input cable 26 are addressed simultaneously by the first scanner 40 it is possible, although unlikely, that within the identified input cable 26, the link L having an available path to the marked input circuit 18 via input grid 14 is not the same link L having an available path to at least one of the marked output circuits 20 via an output grid 16. The ground to the MK lead might have been transmitted through one link L while the current to the negative terminal 36 might have been passed on a different link L. In such case, it will not be possible to find a single free link L within the identified input cable 26 to interconnect the marked input circuit 18 with one of the marked output circuits 20. Consequently, during the second scan the second scanner 42 will not detect the coincident of a ground on the MK lead and a current flow to the DC terminal 36. The second scanner 42 is programmed so that if it cannot identify a free link within at least one complete scan of the 15 links L (1–15) in the identified input cable 26, it stops its scanning operation and generates a recycle signal which is applied to the first scanner 40 causing it to restart its scanning operation in search of a different input cable 26 having a free link L therein.

Once the first scanner 40 identifies another input cable 26 which appears to have a free link therein, the enabled grid selector circuit 38 again applies an enable signal EN2 to the second scanner 42 to permit it to scan within the second identified input cable 26 to find a single free link L therein. If a free link L again cannot be found then the second scanner reapplies the recycle signal to the first scanner so that it can search for a third input cable 26 having a free link L therein. Two recycles are permitted (for a total of three attempts), after which if a free link in the third identified input cable 26 cannot be found the system makes no further attempt to locate a free path for this particular connection. The second scanner 42 is programmed in this case to terminate the scan and generate an NPA signal forcing the release of the marked input and output circuits. To coordinate their operation during recycling, the first scanner 40 applies a reset signal to the second scanner 42 after each reset. Assuming that the second scanner 42 does identify a free link L, the path finding system then implements the second step, namely the selection of one of the marked output circuits 20 having an available path to the identified free link L for connection to the marked input circuit 18. At this time, the ground applied to the free link L by the second scanner is removed.

Referring to FIG. 3 it will be seen that the seventy-five modules 22 in each output grid 16 of FIG. 1 are arranged in five different module groups 44, each having 15 consecutively numbered modules 22. All 15 modules 22 in each group 44 are connected to the same four output cables 22 which are numbered the same as in FIG. 1. Thus the first four output cables 26 of FIG. 1 are connected to the first module group 44, the second four output cables 26 are connected to the second module group 44 and so on. Also, each of the consecutively numbered links L (1–15) within each output cable 26 are connected to a single inlet I of the same numbered module 22 in its respective module group 44. Furthermore, each of the five consecutive inlets I (1–5) of each module 22 is connected to an outlet O of each of the five consecutive matrices 24 in the associated output grid 16 with the same numbered inlet I of each module 22 being connected to the same numbered matrix 24. Each module group 44 has associated therewith an individual group selector circuit 46 while each matrix 24 in an output grid 16 has associated therewith a matrix selector circuit 48 with the letter in each box identifying the module 22 or matrix 24 with which it is respectively associated.

Each output cable 26 has a cable identification lead CI which is connected to a cable identification lead CI of the input cable 26 to which the output cable 26 is connected via the interconnection means 28. After a free link L is identified, a signal such as a ground is applied by the second scanner 42 through the enabled grid selector 38 to the cable identification lead CI of the input cable 26 containing the identified free link L. This signal is then received over the cable identification lead CI of the output cable 26 which is connected to that identified input cable 26. This is necessary because as the network 12 is expanded by the addition of more input and output cables 26, the existing interconnected cables 26 must be arranged so that thereafter some of the existing input cables 26 will no longer be connected to the same existing output cables 26. The cable identification lead CI provides a simple means by which the second step of the path finding operation can be directed to the particular module group 44 to which the identified input cable 26 is connected via its connected output cable 26.

Once the input cable 26 having the free link is identified its respective group 44 is also identified by the enabling of its associated group selector circuit 46 after the free link L is identified. Each of the five cable identification leads CI in the five output cables 26 associated with a group 44 are connected to the group selector circuit 46 associated with that group 44. Hence, a ground signal on any one of the five cable identification leads CI connected to a group selector circuit 46 will enable the same to pass scanning pulses from a third scanner 50 connected to all of the group selector circuits 46 to the five inlets I (1–5) of the 15 modules 22 located in the associated group 44. When the enabled group selector 46 is prepared to pass the scanning pulses it applies an enable signal EN3 to the third scanner 50 to initiate the third scan. The third scanner 50 generates five consecutive ground pulses which are applied sequentially to the five inlets I (1–5) of the single module 22 to which the identified free link L is connected. Since the second scanner 42 is stopped at a particular one of the 15 links L (1–5) of the identified input cable 26, the number of the free link is ascertainable and since each of the 15 links L (1–15) is connected to a consecutive one of the 15 modules 22 in a group 44 having its same number the particular module 22 within this group 44 to which the free link L is connected is also ascertainable. The second scanner 42 applies a signal ED (enable decoder) to the third scanner 50 to direct its five scanning pulses to the five inlets I (1–5) of the module 22 having the same number as the number of the identified free link. The third scanner 50 sequentially applies ground pulses to the five inlets I (1–5) until it detects the flow of current to the negative terminal 36 indicating an available path to at least one marked output circuit 20 from the module 22 to which the free link L is connected. The detection of current flow stops the scanner 50.

Each of the group selector circuits 46 has a lead EMS (enable matrix selector) connected to each of the five matrix selectors 48 associated with its respective output grid 16 so that when a particular group selector circuit 46 is enabled its five associated matrix selectors 48 are also partially enabled. By virtue of the count at which the third scanner 50 stopped a single one of the five matrix selectors 48 will be fully enabled via the enabled group selector circuit 46. The enabled matrix selector circuit 48 will be the one having the same number as the inlet I of module 22 at which the third scanner 50 stopped. When enabled, the matrix selector 48 disconnects the fifty leads interconnecting the 50 inlets I (1–50) of its associated matrix 24 with the 50 leads OC (1–50) of its associated 50 output circuits 20 and connects them to a fourth scanner 52. Once the enabled matrix selector 48 is prepared to pass the scanning pulses, it applies an enable signal EN4 to the fourth scanner 52 to initiate the fourth scanning operation. This enable signal EN4 is also applied to the second scanner 42 to permit it to reapply the ground signal to the free link L which has been identified. The fourth scanner 52 sequentially applies ground pulses to the leads OC (1–50) while it simultaneously scans the 50 inlets I (1–50) in synchronization therewith in search of the ground applied to the free link L. The fourth scanner 52 is stopped by the coincident detection of two conditions; namely the ground from the second scanner 42 through the identified free link L and the matrix 24 via an inlet I and the flow of current to the negative terminal 36 via the associated OC lead. The ground indicates that the particular inlet I of the matrix 24 at which the fourth scanner 52 stopped has an available path through the output grid 16 to the identified free link L, while the flow of current indicates that there is a marked output circuit 20 connectable to this inlet I via the connected lead OC.

With the two steps in the path finding system now completed, the only thing that remains to be done is to operate the crosspoints located in the path found through the switching network 12. Although any number of available paths between the marked input circuit 18 and the selected marked output circuit 20 exist there is only one such path via the identified free link L. Consequently, the energizing potential for operating the crosspoints must be applied to the inlets to which these two circuits are connected via the identified link L to prevent more than one path from being connected between the two. The fourth scanner 52 now connects the ungrounded negative terminal of a grounded DC supply to the MK lead which causes the flow of current via the ground from the second scanner 42 which is now applied to the identified free link L through the input grid 14 and the marked input circuit 18 and then back to the MK lead, operating the crosspoints in this path. A second current flows via the grounded free link L through the output grid 16 to the ungrounded negative terminal of a grounded DC supply which is connected at this time by the fourth scanner 52 to the inlet I of the matrix 24 at which the fourth scanner 52 stopped, operating the crosspoints in this path. Thus, the crosspoints in the input grid 14 are operated by one current while the crosspoints in the output grid 16 are operated by another current assuring sufficient separate energization so that the crosspoints are reliably operated. If the negative terminal 36 were applied to the output circuits 20 through another switching network then the crosspoints therein would be operated by the flow of a third current from the ground applied to the lead OC at which the fourth scanner 52 stopped through the other network to the negative terminal 36. As previously mentioned this assures reliable operation of the crosspoints.

With the electrical signal carrying leads between the marked input circuit 18 and the selected marked output circuit 20 now connected, a signal would be provided such as, for example, via a sleeve lead for holding the path, after which the contacts 30 and 32 in the marked input circuit 18 and the contacts 34 in the marked output circuits 20 would all be opened. The removal of the enable signal EN at that time causes all selector circuits in the path finding system to be disabled thereby removing all the scanner enable signals and resets equipment in the first and second scanner 40 and 42 to prepare the path finding system for servicing the next request for a network connection.

Before proceeding to describe the scanner and selector circuits in detail, it may be helpful to review some of the conventions used hereinafter in describing the logic devices which will be found in the scanner circuits. Two types of flip-flops are described, namely an R-S and a J-K, each having a Q and a $\bar{Q}$ output. A flip-flop is considered to be set when its Q output signal is high and the $\bar{Q}$ output signal is low and is considered to be reset when its Q output is low and the $\bar{Q}$ output is high. An R-S flip-flop is set by a negative going signal applied to its S (set) input and is reset by a negative going signal applied to its R (reset) input. A J-K flip-flop is set by a negative going signal applied to either its T (trigger) input or to its SD (set direct) input while it is reset by a negative going signal applied to its CD (clear direct) input. All flip-flops are reset before path finding begins. An inverter circuit is merely a logic device which inverts a signal passed therethrough so that a high at its input becomes a low at its output and a low as its input becomes a high at its output. A NOR gate produces a high at its output only whenever any one or more of its inputs is low while a NAND gate produces a low at its output only when all of its inputs are high.

Figure 4:
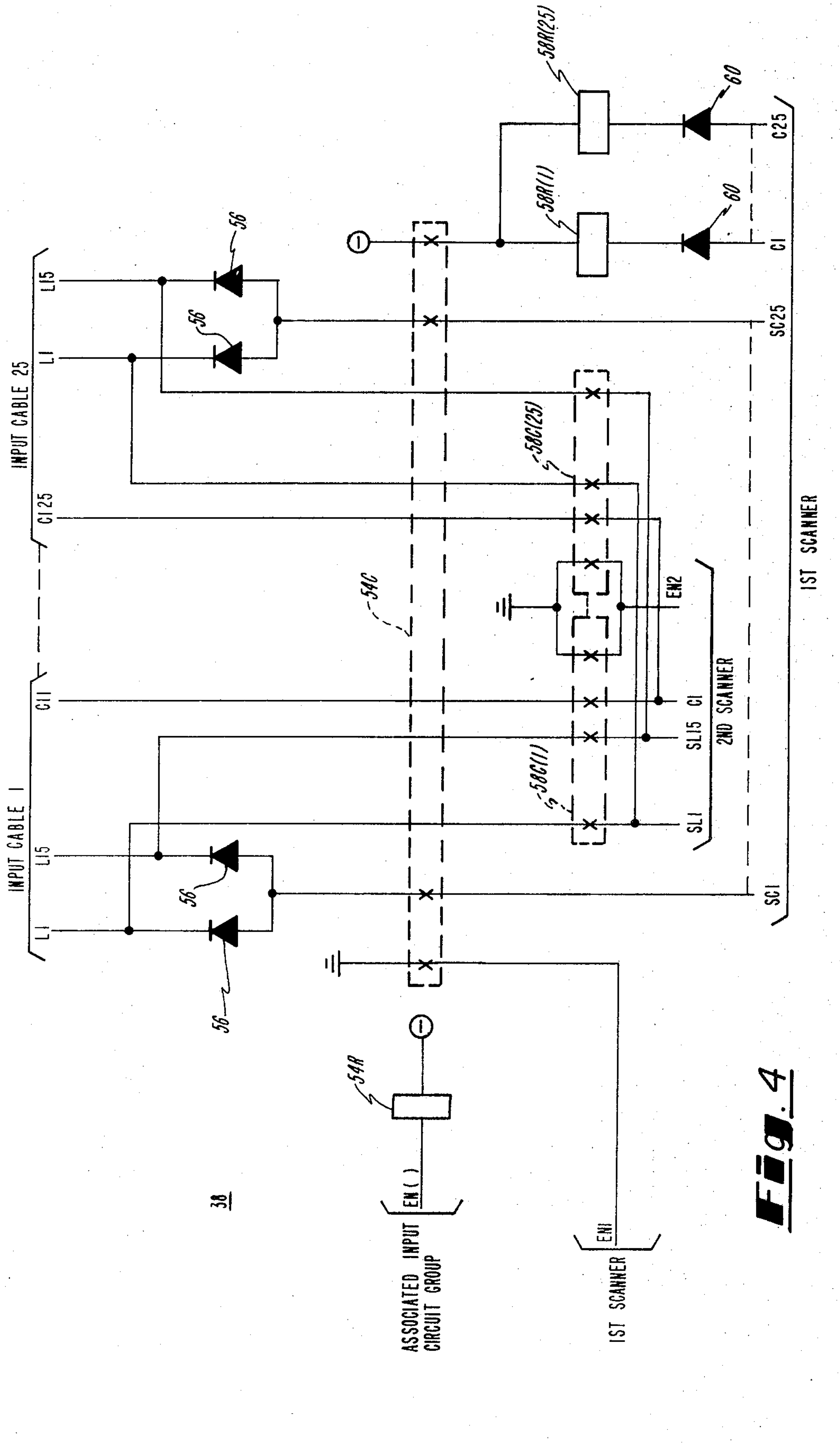
FIG. 4 is a detailed drawing of a grid selector circuit used in the path finding system for directing the first scan to an input grid and the second scan to an identified cable.

As shown in FIG. 4, each grid selector circuit 38 comprises a relay 54R which is connected between a negative DC terminal and the EN( ) lead from the group of input circuits 18 connected to its associated input grid 14. When a ground is applied to the EN( ) lead the relay 54R is actuated to close 25 individual normally open contacts 54C, each of which connects the 15 links L (1–15) of a different input cable 26 via individual diodes 56 to a separate one of 25 scan cable leads SC (1–25) from the first scanner 40. The first scanner 40 applies the 25 consecutive scanning pulses to these 25 SC leads in sequence to identify an input cable 26 having a free link therein. The relay 54R also closes other normally open contacts 54C for applying a negative potential to one side of 25 different relays 58R (1–25) each having the other side connected via individual diodes 60 to 25 separate cable leads C (1–25) also connected to the first scanner 40 to enable one of the relays 58R to be later actuated to permit the second scanning operation for a free link L within an identified input cable 26. Other normally open contacts 54C are closed by the actuation of relay 54R to apply an enable signal represented by a ground to the first scanner via lead EN1 to initiate the first scanning operation, the enabled grid selector 38 now being prepared to pass the scanning pulses.

Figure 5:
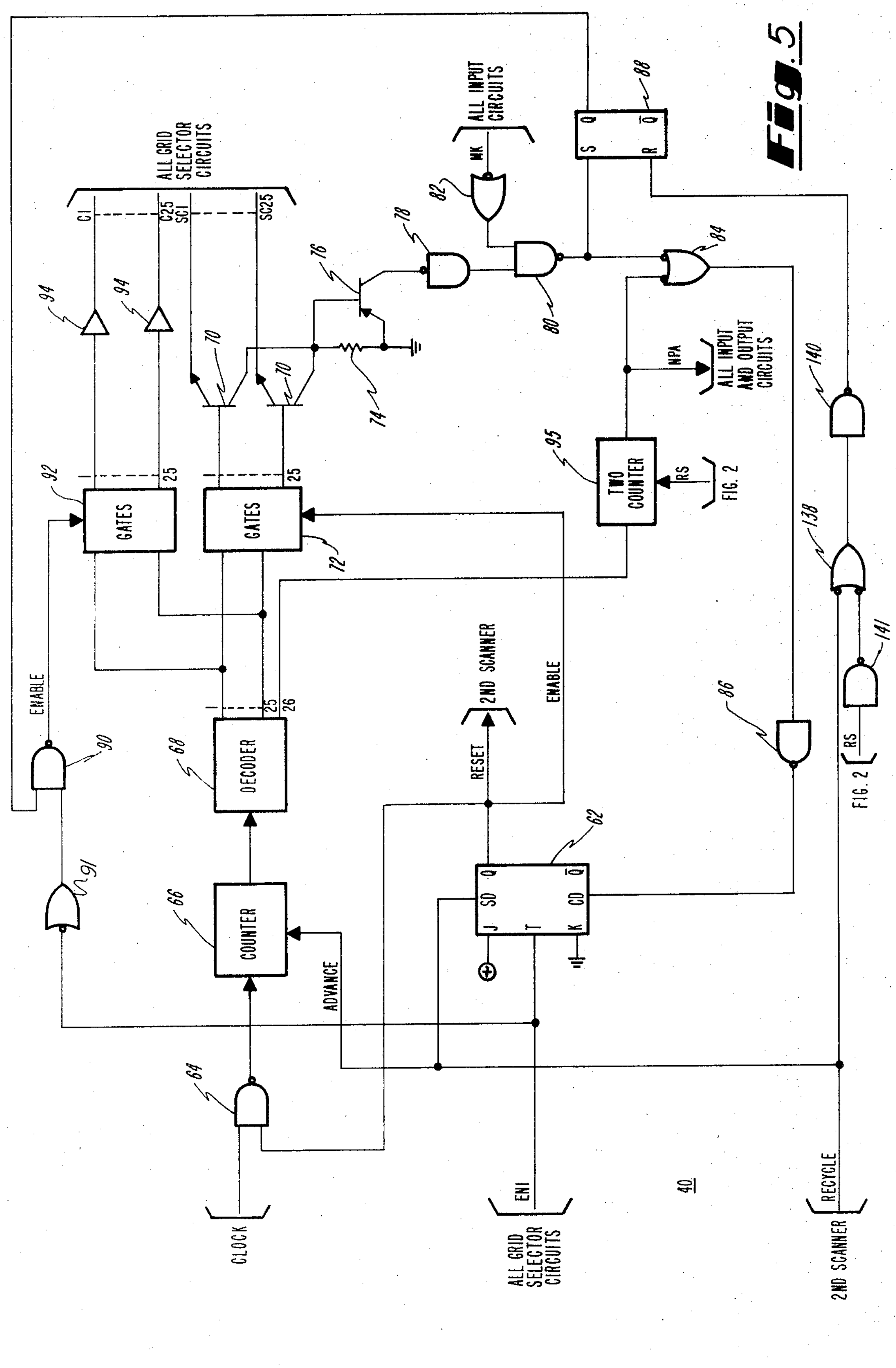
FIG. 5 is a detailed drawing of the first scanner used for identifying a cable during the first scan.

The enable signal via lead EN1 is applied to the T input of a J-K flip-flop 62 of the first scanner 40 which is shown in detail in FIG. 5. This sets the flip-flop 62 which produces a high at its Q output to enable a NAND gate 64 to pass clock pulses to a counter 66. The output of the counter 66 is applied to a decoder 68 having 26 outputs, the first 25 of which are individually connected to the bases of 25 transistors 70 through a gating circuit 72 which is enabled at this time by the set condition of flip-flop 62 to pass ground pulses generated sequentially at the decoder outputs. Each of the transistors 70 has its emitter connected to a different one of the 25 scan cable leads SC (1–25) connected to all the grid selector circuits 38, while all the collectors thereof are connected to a ground via a resistor 74. A single transistor 76 has its emitter connected to ground while its base is connected to the other side of resistor 74. The collector of transistor 76 is connected to the input of an inverter circuit 78 whose output is connected to one of the two inputs of a NAND gate 80. The other input to NAND gate 80 is derived from the output of an inverter circuit 82 whose input is connected the lead MK.

As the transistors 70 are sequentially forward biased by the sequential application of a ground pulse to their respective bases from the decoder 68, the ground via resistor 74 is enabled to appear at their respective emitter terminals. Since each of the emitter terminals is connected to a different group of 15 links L (1–15) in each of the 25 input cables 26 being scanned, when an input cable 26 having a link L with an available path to the marked input circuit 18 via its associated input grid 14 is addressed by the scanner 40, ground will appear at the MK lead input of the inverter 82 thereby partially enabling NAND gate 80. The transistor 76 functions as a sensitive current detector which is forward biased to saturation by the flow of current from the ground through resistor 74 to the negative terminal 36 via the addressed input cable 26 having a link L with an available path to at least one marked output circuits 20 via an output grid 16. When fully saturated, the transistor 76 applies the ground at its emitter to to the input of the inverter 78 to partially enable the NAND gate 80. NAND gate 80 is only fully enabled by the coincident detection of the two foregoing conditions, namely a ground on the MK lead indicating an available path from the identified input cable 26 to the marked input circuit 18 and the flow of current as detected by transistor 78 indicating an available path from the identified input cable 26 to at least one marked output circuit 20. The output of NAND gate 80 is connected to one of the inputs of a NOR gate 84 whose output is applied to the CD input of flip-flop 62 via an inverter circuit 86. Consequently, when a low signal is produced at the fully enabled NAND gate 80, the flip-flop 62 is reset which then disables NAND gate 64 from passing clock pulses to the counter 66, thereby stopping the first scanning operation. The reset condition of flip-flop 62 immediately disables the gating circuit 72 so that the transistor 70 just forward biased to conduction is no longer conductive so that the ground connected to resistor 74 cannot appear at the associated SC lead nor at the inverter circuit 78 input.

The low signal produced at the output of NAND gate 80 is also applied to the S input of an R-S flip-flop 88. This sets flip-flop 88 whose Q output is applied to a NAND gate 90 to partially enable it. The other input to NAND gate 90 is taken from the lead EN1 via an inverter 91 so that with the ground signal applied to lead EN1, NAND gate 90 is now fully enabled to apply an enable signal to a gating circuit 92 which is connected between the first 25 outputs of the decoder 68 and the 25 cable leads C (1–25) connected to all ground selector circuits 38 via driver amplifier circuits 94. The ground appearing at one of the 25 outputs of the decoder 68 is applied through the enabled gates 92 to one of the 25 leads C (1–25) to implement the second scanning operation for a single free link L in the identified input cable 26.

Should the first scanner 40 be unable to identify an input cable 26 having free links connected to the marked input and output circuits within at least one complete scan of the 25 input cables 26, then the scanner 40 is stopped and an NPA signal is generated to force the release of the marked input and output circuits. This is accomplished through the use of a 26th output from the decoder 68 and a two counter 95 connected thereto which generates a low signal at its NPA output whenever it detects two consecutive ground pulses at its input. The first ground pulse at the 26th output of decoder 68 marks the beginning of a complete scan through the first 25 outputs thereof while the second ground pulse marks the ending of that complete scan. If the counter 66 is not stopped in between the generation of the first and second ground pulses on output 26 of decoder 68, the two counter 95 generates the low NPA signal which is applied to the marked input and output circuits to force their release and to the second input of NOR gate 84 to reset flip-flop 62 to stop the counter 66.

Assuming that the first scanner 40 is successful in identifying an input cable 26 having free links to the marked input and output circuits, the ground from the decoder 68 output is applied to one of the 25 relays 58R in the enabled grid selector circuit 38 via the lead C corresponding to the count in the decoder 68 which is the same as the number of the identified input cable 26. This operates that particular relay 58R. Each realy 58R has its own group of normally open contacts 58C for interconnecting the 15 links L (1–15) of its associated input cable 26 with 15 scan link leads SL (1–15) from the second scanner 42. Consequently, when a relay 58R is operated, its associated closed contacts 58C permit the second scanning operation to take place to identify a single free link L within the identified input cable 26. Each relay 58R also has normally open contacts 58C which are closed for connecting the cable identification lead CI of the identified input cable 26 to the CI lead from the second scanner 42. Other normally open contacts 54C of relay 58R are closed to apply a ground to the lead EN2 connected to the second scanner 42 to enable the second scanning operation to begin.

Figure 6:
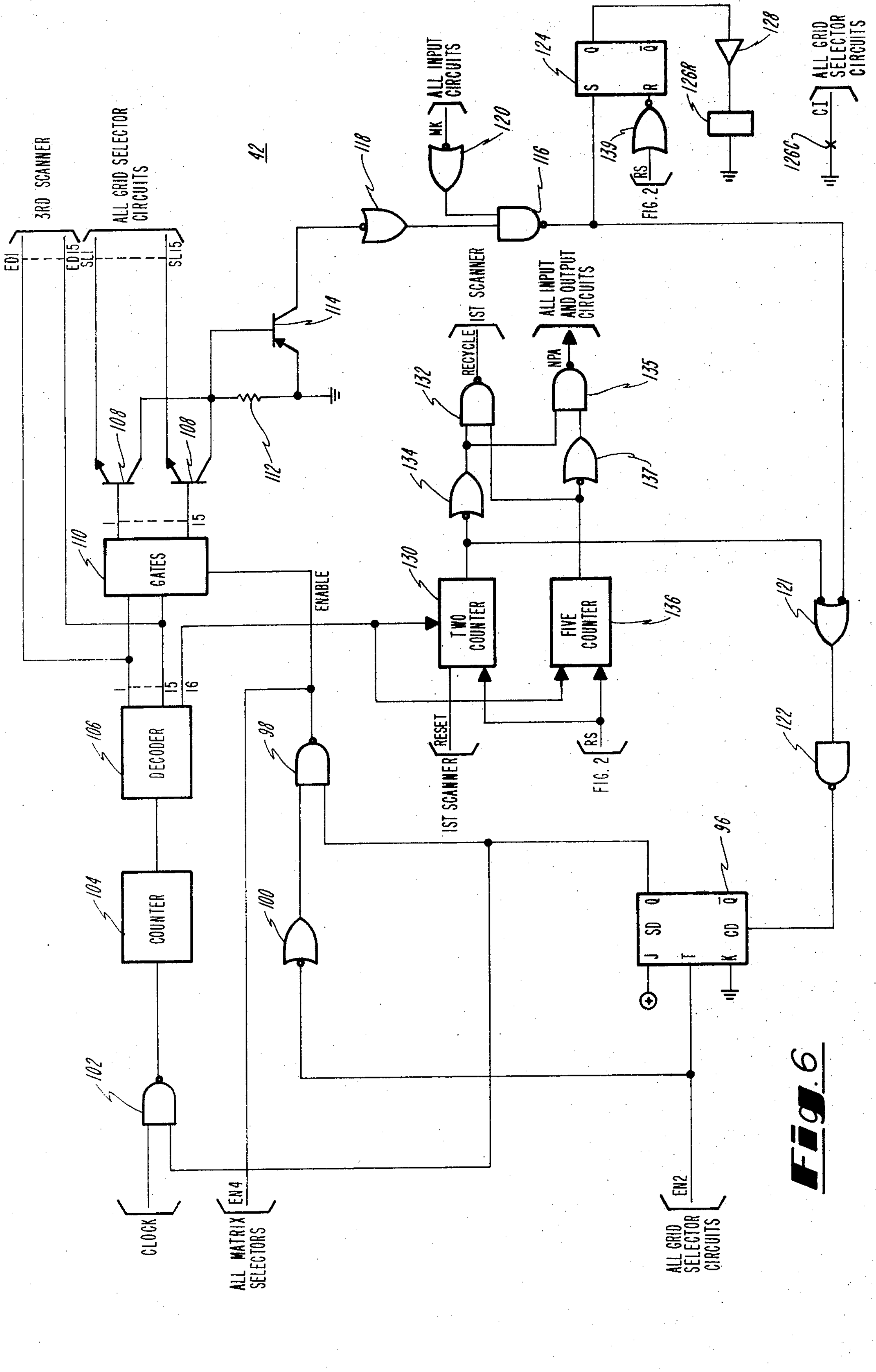
FIG. 6 is a detailed drawing of the second scanner used for identifying a link within the identified cable.

Referring now to FIG. 6 which is a detailed diagram of the second scanner 42, it is seen that the enable signal via lead EN2 is applied to the T input of a flip-flop 96 as well as to an input of a NAND gate 98 via an inverter circuit 100. The flip-flop 96 is set at this time to enable a NAND gate 102 having an input connected to its Q output to pass clock pulses to a counter 104 whose output is applied to a decoder 106. The first 15 outputs of the 16 outputs of decoder 106 are individually connected to the bases of 15 transistors 108 via a gating circuit 110 to sequentially forward bias these transistors. The gating circuit 110 is enabled to pass the forward biasing ground pulses at this time since both inputs to NAND gate 98 are high. Each transistor 108 has its emitter connected to a different one of the 15 scan link leads SL (1–15) which are connected to all of the grid selector circuits 38 while all the collectors of transistors 108 are connected to a ground via a resistor 112. The second scanner 42 has a current detector transistor 114 whose emitter is connected to ground, whose base is connected to the other end of resistor 112 and whose collector is connected to a NAND gate 116 via an inverter circuit 118. The NAND gate 116 has a second input connected to the lead MK via an inverter circuit 120, the arrangement being the same as that described earlier for the first scanner 40, so that the detection of a ground on the lead MK coincident with the detection of a current flow by transistor 114 being driven into saturation, indicating a free link L, produces a low signal at the output of NAND gate 116. The output of NAND gate 116 is connected to an input of a NOR gate 121 whose output is connected to the CD input of flip-flop 96 via an inverter 122. Consequently, when a free link L is found in the identified input cable 26, the flip-flop 96 is reset so that the NAND gate 102 is disabled from passing clock pulses and the counter 104 is stopped. Also, NAND gate 98 is disabled so that the gates 110 are likewise disabled from passing the decoder 106 ground via the output at which the counter 104 stopped to the transistor 108 which was just forward biased. Hence, the ground through resistor 112 no longer appears at the corresponding lead SL nor at the input of inverter 118. The output of NAND gate 116 is also connected to the S input of an R-S flip-flop 124 whose Q output is connected to a relay 126R via a driver amplifier circuit 128. When flip-flop 124 is set upon the enabling of NAND gate 116, relay 126R is actuated, thereby closing its normally open contacts 126C to apply a ground to the lead CI which is connected to all CI leads in all grid selector circuits 38 for the purpose of enabling the group selector circuit 44 associated with the output cable 26 to which the identified input cable 26 is connected.

As indicated earlier, it is possible, although not likely, that the link L in the identified input cable 26 having an available path to a marked input circuit 18 via the input grid 14 may not be the same as the link L therein having an available path to at least one marked output circuit 20 via an output grid 16. For instance, during the first scan by the first scanner 40 the ground might have been passed through link L1 while the current might have been passed through link L 15 of the identified input cable 26. In such case, the second scanner 42 will not be able to identify a free link as indicated by the coincidence of a ground on the lead MK and a current flow via the current detector 114 so that it would otherwise continue scanning in vain. To prevent this, the 16th output from the decoder 106 is connected to the input of a two counter 130 which produces a low signal at its output whenever two consecutive ground pulses are detected at its input. The beginning of a complete scan of the 15 links L (1–15) in an identified input cable 26 is marked by the first ground pulse applied to the 16th output of decoder 106 while the end of that scan is marked by the second ground pulse applied thereto. If a free link L is not found between this first and second ground pulse, it means that no free link L in the identified input cable 26 can be found during a full scan so that the second pulse causes the two counter 130 to produce a low signal at its output. The output of the two counter 130 is connected to a second input of NOR gate 121 to reset the flip-flop 96 in order to stop the scanning operation by disabling NAND gate 102. The output of the two counter 130 is also applied to a NAND gate 132 via an inverter circuit 134 to provide a recycle signal at the output of NAND gate 132 to enable the first scanner 40 to restart its scan to search for another input cable 26 having a free link L therein. At this time a second input of NAND gate 132 connected to the output of a five counter 136, is high so that NAND gate 132 is fully enabled to apply the recycle signal to the first scanner 40.

Returning to FIG. 5, it is seen that the recycle signal from the second scanner 42 is applied to one input of a NOR gate 138 whose output is connected to the R input of flip-flop 88 via an inverter circuit 140. This resets flip-flop 88 thereby disabling the gates 92 so that the relay 58R which was actuated in the enabled grid selector circuit 38 is deenergized thereby disconnecting the links L (1–15) of the first identified input cable 26 from the scan link leads SL (1–15) of the second scanner 42 and removing the enable signal EN2. Also the recycle signal is applied to the counter 66 to advance it by one count so that the restart of the first scan is not begun at the previously identified input cable 26 in which a free link cannot be found. The recycle signal is also applied to the SD input of flip-flop 62 to set it once again, enabling the NAND gate 64 to pass clock pulses to the counter 66. The high Q output of flip-flop 62 now also reenables the gates 72 to pass the scanning pulses and provides a reset signal which is applied to the two counter 130 of the second scanner 42 to reset its count back to zero. Once the first scanner 40 finds an input cable 26 appearing to have a free link it stops and applies a ground to operate one of the relays 58R in the enabled grid selector circuit 38 as it did before. The enable signal EN2 is then again applied to the flip-flop 96 in the second scanner 42 to permit it to make a second attempt to find a free link L in the newly identified input cable 26. If a free link cannot be found once again for the reason previously given, then a second recycle is made in the same manner as before to permit the first scanner 40 to search for a third input cable 26 having a free link L. A third recycle (for a fourth cable) is prevented by the five counter 136 in the second scanner 42 which produces a low at its output after the first ground pulse on the 16th output of decoder 106 is detected during the third attempt by the second scanner 42 to find a free link L in the third identified input cable 26. This low, which disables NAND gate 132 to prevent the generation of a recycle signal, is applied to a NAND gate 135 to partially enable it via an inverter circuit 137. The output of the two counter 130 is connected to a second input of NAND gate 135 via the inverter 134 to fully enable it when a second pulse on the 16th output of decoder 106 is detected during the third scanning attempt by scanner 42 indicating no free link L can be found after a complete scan. This produces an NPA signal at the output of NAND gate 135 to force the release of the marked input and output circuits.

Whether or not a complete path finding operation ends in successfully finding a free path for effecting a connection, the J-K flip-flops in all scanners including the first and second scanners 40 and 42, will always be in the proper reset condition prior to the next service request. The R-S flip-flops 88 and 124 in scanners 40 and 42, however, will not be in the proper reset condition prior to the next service request if a free link was in fact found. To reset these flip-flops at the end of a successful path finding operation, the enable signal EN is applied via the RS lead to their R inputs via an inverter 139 connected directly to the R input of flip-flop 124 and an inverter 141 connected indirectly to the R input of flip-flop 88 through an input of NOR gate 138. It will be readily seen that when the ground signal EN on lead RS is removed at the completion of a successful path finding operation, the flip-flops 88 and 124 will be reset in preparation for the next service request. The RS lead is also connected to the two counter 95 in the first scanner 40 and the two counter 130 and five counter 136 in the second scanner 42 to reset their counts to zero at the end of a path finding operation.

Figure 7:
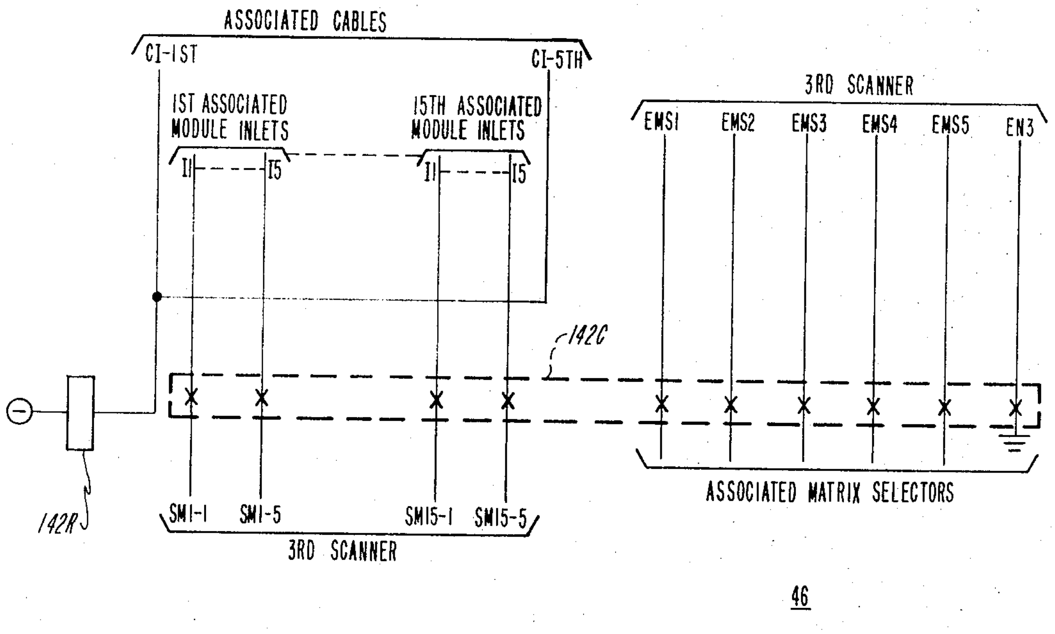
FIG. 7 is a detailed drawing of a group selector circuit used for directing the third scan to an identified module.

Once a free link L is identified, by the second scanner 42, the flip-flop 124 is set to operate relay 126R as previously mentioned. The closing of contacts 126C at this time applies a ground to the CI lead of the identified input cable 26 which is connected to the CI lead of the associated output cable 26, thereby enabling the group selector circuit 46 connected thereto. As shown in FIG. 7, each of the group selector circuits 46 has a relay 142R connected between a negative terminal and the five CI leads of the associated five output cables 26. Hence, a ground on any one of these five CI leads causes the relay 142R to operate closing all of its normally open contacts 142C. Seventy-five of the contacts 142C are closed to connect the inlets I (1–5) of each of the 15 modules 22 in the group 44 associated with the group selector circuit 46 to the scan module leads (SM1-1) – (SM15-5) connected to the third scanner 50. Five other of the normally open contacts 142C are closed to connect the five EMS leads from the third scanner 50 to the five matrix selector circuits 48 in the output grid 16 with which the enabled group selector 46 is associated. Other normally open contacts 142C of the relay 142R are closed to apply a ground to the third scanner via a lead EN3 to enable it to initiate the third scanning operation.

Figure 8:
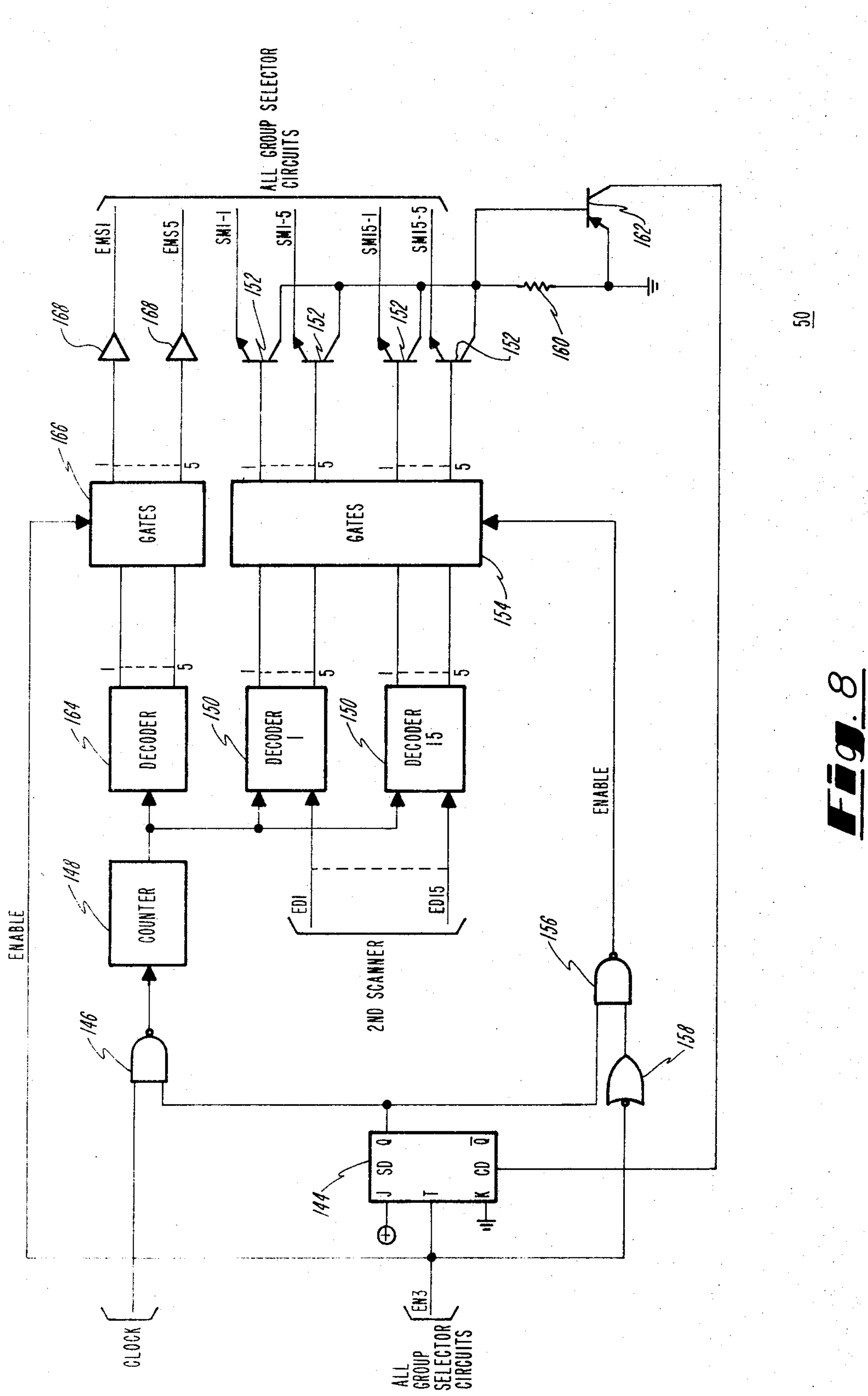
FIG. 8 is a detailed drawing of the third scanner used for identifying a matrix having a marked output inlet with an available path to the identified module.

As shown in FIG. 8 which details the third scanner 50, the ground via the lead EN3 is applied to the T input of a flip-flop 144, the Q output of which is applied to a NAND gate 146 so that when the flip-flop 144 is set, clock pulses are applied to a counter 148. The output of the counter 148 is applied to 15 decoders 150, each of which is connected to the second scanner via a different one of the 15 leads ED (1–15). Each of the 15 leads ED (1–15) is connected to a different one of the first 15 outputs of decoder 106 in the second scanner 42 so that whichever output the decoder 106 is stopped at will enable its associated decoder 150 to respond to the counter 148. Each of the 15 decoders 150 has five outputs connected to the bases of different transistors 152 via a gating circuit 154. Whenever the third scanner 50 is running, the gates 154 are enabled to pass scanning pulses by a NAND gate 156 having one input connected to the Q output of flip-flop 144 and the other output connected to the lead EN3 via an inverter circuit 158. Each of the emitters of the transistors 152 is connected to a different one of the scanning leads (SM1-1) – (SM15-5) to all group selector circuits 46 while all the collectors of the transistors 152 are connected to a ground via a resistor 160. A current detector transistor 162 has its emitter connected to the ground, its base connected to the other side of the resistor 160 and its collector connected to the CD input of flip-flop 144. When the counter 148 is operated only those five transistors 152 having their bases connected to the enabled decoder 150 via the gating circuit 154 will be forward biased sequentially. Should a transistor 152 whose base is forward biased have its emitter connected to an inlet I of a module 22 having an available path via one of the matrices 24 to at least one marked output circuit 20, the flow of current to the negative terminal 36 from the ground connected to resistor 160 will drive the current detector transistor 162 into saturation, thereby permitting the ground to reset the flip-flop 144 stopping the scanning operation. The low produced at the Q output of flip-flop 144 disables NAND gate 156 thereby disabling the gates 154. Another decoder 164 connected to the output of the counter 148 has its five outputs connected through a gating circuit 166 and driver amplifier 168 to the five EMS leads which are connected to all the group selector circuits 146. The gates 166 are enabled by the presence of a ground on the lead EN3 so that the decoder 164 applies a ground to the EMS lead at which the enabled decoder 150 has stopped.

Figure 9:
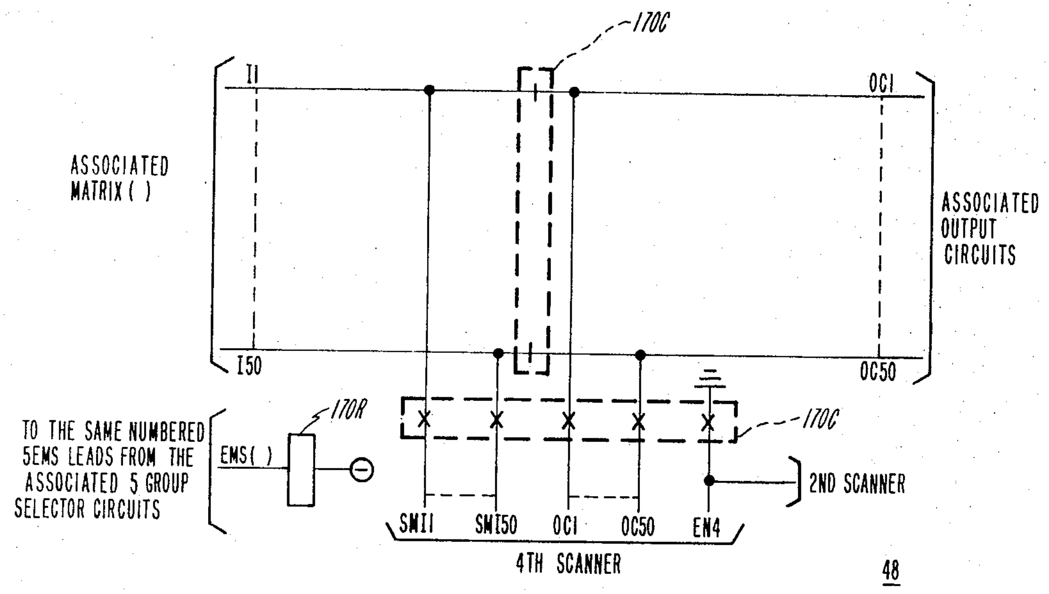
FIG. 9 is a detailed drawing of a matrix selector circuit used for directing the fourth scan to the inlets of the identified matrix.

Each of the five EMS leads from the third scanner 50 are connected through all of the group selector circuits 46 to all of the matrix selectors 48 so that once the third scanner 50 is stopped a matrix selector 48 will be enabled. As shown in FIG. 9 each matrix selector circuit 48 has a relay 170R which is connected to the same numbered five EMS leads from the five group selector circuits 46 of its associated output grid 16 so that when a particular group selector circuit 46 is enabled it partially enables all five matrix selectors 48 in that output grid 16. The one matrix selector 48 within the group of five which will be fully enabled is the one connected to the EMS lead of the third scanner 50 having a ground applied thereto by the decoder 164. This matrix selector 48 will be the one associated with the matrix 24 having the same number as the inlet I at which the enabled decoder 150 stopped. By virtue of the stopping of the third scanner 50, at that inlet I there must be an available path therefrom through the matrix 24 to at least one marked output circuit 20 connected to that matrix 24. The ground applied to the relay 170R via the EMS lead from the third scanner 50 causes it to operate, thereby closing normally open contacts 170C and opening the 50 normally closed contacts 170C which connected the 50 inlets I (I–50) of the associated matrix 24 with the respective 50 leads OC (1–50) of the output circuit 20 connected thereto. The 50 inlets I (1–50) of the matrix 24 are now connected directly to 50 separate scan matrix inlet leads SMI (1–50) of the fourth scanner 52 while the 50 leads OC (1–50) are connected to 50 separate scan output circuit leads SOC (1–50) also connected to the fourth scanner 52. Other normally open contacts 170C of the 170R are closed to apply a ground via a lead EN4 to the fourth scanner 52 to initiate the fourth scanning operation. Lead EN4 is also connected to the second scanner 42 to reenable the gates 110 at this time so that the decoder 106 forward biases whichever one of the transistors 108 it is stopped at to permit the ground via resistor 112 to be reapplied to the identified free link L.

Figure 10:
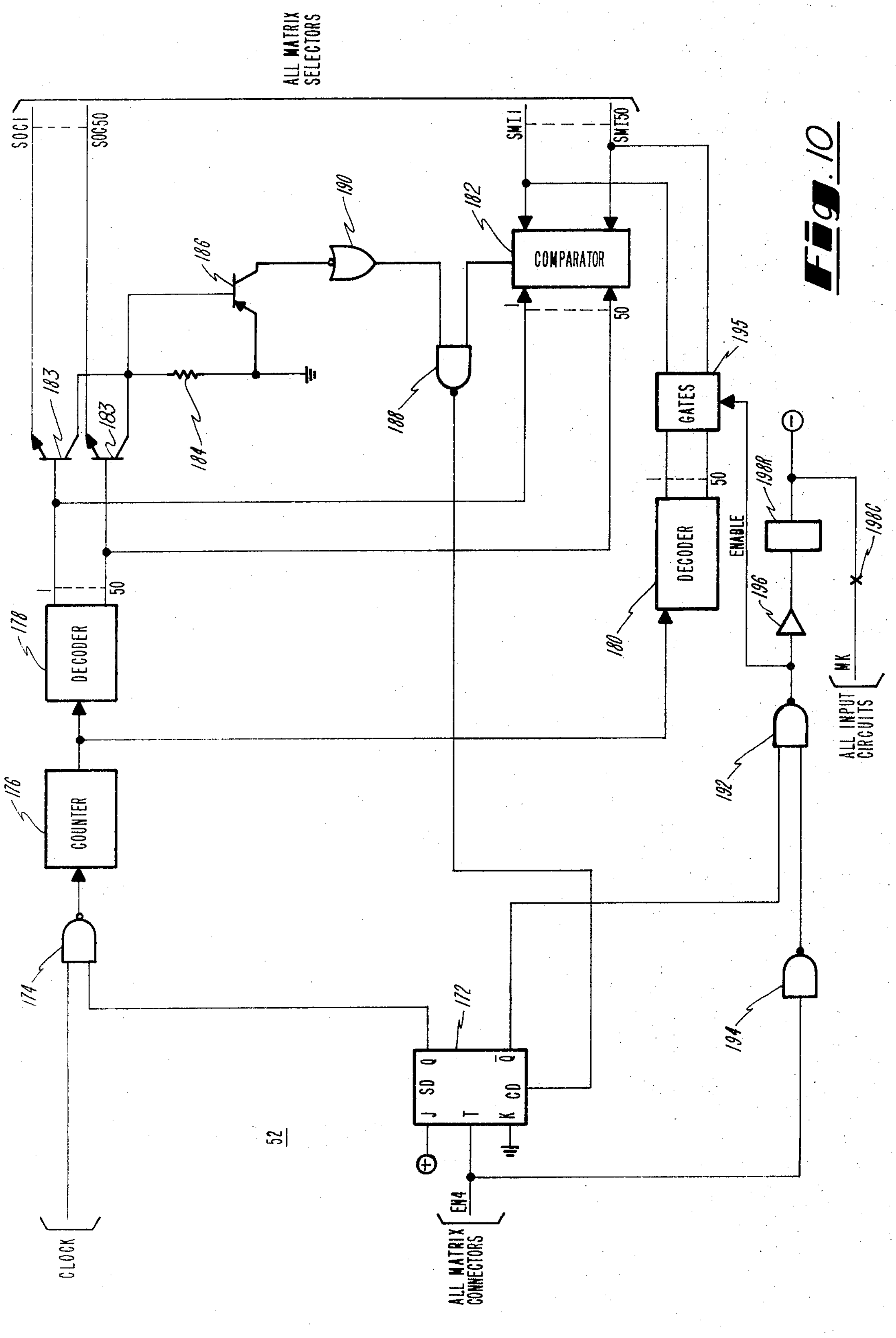
FIG. 10 is a detailed drawing of the fourth scanner used to select a marked input outlet of the identified matrix having an available path to the identified link and thereafter effectuating a connection.

Looking now to FIG. 10 which details the fourth scanner 52, the ground via lead EN4 is applied to the T input of a flip-flop 172 which is set to enable a NAND gate 174 to pass clock pulses to a counter 176. The counter 176 is connected to two decoders 178 and 180, each having 50 outputs. The 50 outputs of decoder 178 are connected both to a comparator circuit 182 and to the individual bases of 50 transistors 183 whose emitters are connected to different ones of the 50 leads SOC (1–50) connected to all matrix selectors 48 and whose collectors are all connected to a ground via a resistor 184. A current detector transistor 186 has its emitter connected to the ground, its base connected to the other side of resistor 184 and its collector connected to an input of a NAND gate 188 via an inverter circuit 190. A second input to the NAND gate 188 is connected to the output of the comparator circuit 182, which has other inputs connected to the 50 leads SMI (1–50) from all the matrix selectors 48. As the 50 outputs from the decoder 178 are sequentially pulsed, the comparator 180 is enabled to sequentially address the 50 SMI leads in search of the ground applied to the free link L by the second scanner 42. Should that ground be detected on one of the SMI leads, indicating an available path from the inlet I of the associated matrix 24 to the identified free link L, the comparator circuit produces a high at its output. Also a current flow detected by the current detector transistor 186 when a transistor 182 is forward biased indicates that a marked output circuit 20 is connected to the OC lead to which the emitter is connected. The scanning of the SOC leads is synchronized to the scanning of the SMI leads. The coincident detection of these two conditions indicating an inlet I of the matrix 24 having an available path to the identified free link L and a marked output circuit 20 connected thereto, enables the NAND gate 188 to reset flip-flop 172 via its CD input thereby stopping the fourth scanning operation. The $\bar{Q}$ output of flip-flop 172 is connected to one input of a NAND gate 192 having a second input connected to the lead EN4 via an inverter circuit 194. When a ground is applied to the lead EN4 and the flip-flop 174 is reset thereafter, the NAND gate 192 is enabled to apply an enable signal to a gating circuit 195 interposed between the decoder 180 and the fifty SMI leads. The decoder 180 applies a negative potential via whichever output it is stopped at to the corresponding SMI lead through the enabled gate 195. This causes current to flow through the connected inlet I of the matrix 24 from the ground applied to the free link L by the second scanner 42 operating all crosspoints in that path. The output of NAND gate 192 is also connected through a driver amplifier 196 to a relay 198R which is also connected to a negative terminal. Consequently, when the NAND gate 192 is enabled the relay 198R is actuated to close its normally open contacts 198C applying a negative potential to the MK lead connected to all input circuits 18. This negative potential causes current to flow from the ground applied to the free link L through the input grid 14 and the marked input circuit 18 back to the MK lead operating all crosspoints in this path. This completes the physical connection between the marked input circuit 18 and a selected one of the marked output circuits 20 via the free link L. The detection of continuing current through the interconnected input circuit 18 and the output circuit 20 is then used to release these circuits from the mark leads of the network 12 through the opening of contacts 30 and 34. The removal of the enable signal EN by the opening of contacts 32 causes all the selector circuits to be disabled, thereby deactuating all relays and removing all the scanner enable signals and resets the first and second scanner equipment so that the path finding system is now ready to service the next interconnection request.

The path finding system of the invention is thus seen to provide greater flexibility for the marking arrangement used with respect to the output circuits since the disclosed system will function properly whether one output circuit, more than one output circuit in any distributed arrangement whatsoever over the matrices and output grids or all of the output circuits are marked. Moreover all scanners are alike and are designed to operate at maximum capacity with the smallest network possible, namely one having a single input grid and a single output grid. As the network is expanded by the addition of input and output grids the same scanners are used without increasing their capacity by properly directing the scanning pulses through the use of selector circuits. Consequently these scanners are always operating at maximum capacity irrespective of the stage of development of the network resulting in the most effective and efficient use of equipment. Furthermore, reliable operation of the crosspoints is assured by providing two separate current operating paths through the network and a third current path if need be to some other network connected to the output circuits as mentioned previously.

In any system such as the foregoing many changes can be made which are not directed to the novel features taught by the invention. Bearing this in mind, the specific embodiment disclosed herein is intended to be merely illustrative and not restrictive of the invention since various modifications readily apparent to those familiar with the art can be made without departing from the scope and spirit of the invention as claimed hereinbelow.

What is claimed is:

1. In combination with a switching network having a plurality of input inlets and a plurality of output inlets arranged in grids, said grids connected via at least one of a plurality of links, with each link having a unique path to any one input and any one output inlet of said grids connected thereby, a path finding system for interconnecting a marked input inlet with a single one of one or more marked output inlets comprising:

first scanning means for identifying a link having an available path to the marked input inlet and to at least one marked output inlet;

second scanning means for selecting a marked output inlet having an available path to the identified link, and circuit means for applying an energizing potential to the marked input inlet and the selected output inlet via the identified link.

2. The path finding system of claim 1 wherein the plurality of links are arranged in cables and said first scanning means includes a first scanner for identifying a cable having a link with an available path to the marked input inlet and a link with an available path to at least one marked output inlet and a second scanner for identifying a link in the identified cable having both available paths.

3. The path finding system of claim 2 wherein said first scanning means includes recycle means for enabling said first scanner to search for another cable in response to a signal from said second scanner indicating that a link having both available paths cannot be found.

4. In combination with a switching network which includes an input grid having a plurality of input inlets, each being connectable to any one of a plurality of outlets thereof via a single unique path, an output grid having a plurality of modules with each module having a plurality of outlets, each of which is connectable via inlets thereof to any one of a plurality of output inlets of the output grid via a single unique path, and a plurality of links, each being connected between a single input grid outlet and a single module outlet, a path finding system for interconnecting a marked input inlet with a single one of one or more marked output inlets comprising:

first scanning means for identifying a link having an available path to the marked input inlet and to at least one marked output inlet;

identification means for identifying the module to which the identified link is connected;

second scanning means for selecting a marked output inlet having an available path to the identified module, and circuit means for applying an energizing potential to the marked input inlet and selected output inlet via the identified free link.

5. The path finding system of claim 4 wherein the plurality of links are arranged in cables and said first scanning means includes a first scanner for identifying a cable having a link with an available path to the marked input inlet and a link with an available path to at least one marked output inlet and a second scanner for identifying a link in the identified cable having both available paths.

6. The path finding system of claim 5 wherein said first scanning means includes recycle means for enabling said first scanner to search for another cable in response to a signal from said second scanner indicating that a link having both available paths cannot be found.

7. The path finding system of claim 5 wherein the modules are arranged in groups, each group having the same number of consecutively numbered modules and the cables are arranged in as many groups as there are groups of modules, with each cable having as many consecutively numbered links therein as there are modules in a group so that each group of cables is associated with a module group and each link in a cable is connected to an outlet of the same numbered module in its associated module group.

8. The path finding system of claim 7 wherein said identification means includes a plurality of group selector circuits, each being connected between said second scanning means and the inlets of a different one of said module groups to be enabled to pass scanning pulses therebetween in response to an identification signal from said first scanning means when one of the cables connected to its respective module group has been identified and circuit means responsive to a signal from said second scanner for applying scanning pulses to the inlets of the module having the same number as the identified link.

9. The path finding system of claim 8 wherein each cable includes a cable identification lead connected between the group selector circuit of its associated module group and said first scanning means and said identification signal is applied to the identification lead of the identified cable.

10. In combination with a switching network which includes an input grid having a plurality of grid inlets each of which is connectable to any one of a plurality of grid outlets via a single unique path, an output grid having a plurality of modules, each with a plurality of outlets, and a plurality of matrices, each with a plurality of inlets, with each matrix having an outlet connected to an inlet of each module so that any module outlet is connectable to any matrix inlet by a single unique path and a plurality of links each one being connected between a single module outlet and a single grid outlet, a path finding system for interconnecting a marked grid inlet with a single one of one or more marked matrix inlets comprising:

first scanning means for identifying a link having an available path to the marked grid inlet and to at least one marked matrix inlet;

module identification means for identifying the module to which the identified link is connected;

second scanning means for identifying an inlet of the identified module having a path to at least one marked inlet;

matrix identification means for identifying the matrix to which the identified module inlet is connected;

third scanning means for selecting one of the marked inlets of the identified matrix having an available path to the identified link, and circuit means for applying an energizing potential to the marked grid inlet and selected matrix inlet via the identified free link.

11. The path finding system of claim 10 wherein the plurality of links are arranged in cables and said first scanning means includes a first scanner for identifying a cable having a link with an available path to the marked grid inlet and a link with an available path to at least one marked matrix inlet and a second scanner for identifying a link in the identified cable having both available paths.

12. The path finding system of claim 11 wherein said first scanning means includes recycle means for enabling said first scanner to search for another cable in response to a signal from said second scanner indicating that a link having both available paths cannot be found.

13. The path finding system of claim 11 wherein the modules are arranged in groups, each group having the same number of consecutively numbered modules and the cables are arranged in as many groups as there are groups of modules, with each cable having as many consecutively numbered links therein as there are modules in a group so that each group of cables is associated with a module group and each link in a cable is connected to an outlet of the same numbered module in its associated module group.

14. The path finding system of claim 13 wherein said module identification means includes a plurality of group selector circuits, each being connected between said second scanning means and the inlets of a different one of said module groups to be enabled to pass scanning pulses therebetween in response to a cable identification signal from said first scanning means when one of the cables connected to its respective module group has been identified and circuit means responsive to a signal from said second scanner for applying scanning pulses to the inlets of the module having the same number as the identified link.

15. The path finding system of claim 14 wherein each cable includes a cable identification lead connected between the group selector circuit of its associated module group and said first scanning means and said cable identification signal is applied to the identification lead of the identified cable.

16. The path finding system of claim 13 wherein said second scanning means includes a third scanner for identifying an inlet of the identified module having an available path to at least one marked matrix inlet.

17. The path finding system of claim 16 wherein the matrices and the inlets of each module are consecutively numbered, with each module inlet being connected to an outlet of the same numbered matrix and said matrix identification means includes a plurality of matrix selector circuits, each being connected between said third scanning means and the inlets of a different one of said matrices to be enabled to pass scanning pulses therebetween in response to a matrix identification signal from said third scanner when the identified module inlet has the same number as its connected matrix.

18. In combination with a switching network which includes a plurality of input grids, each having grid inlets and outlets with each grid inlet being connectable to a grid outlet via a single unique path, a plurality of output grids, each having modules with a plurality of outlets and matrices with a plurality of inlets with each matrix having an outlet connected to an inlet of each module so that any module outlet is connectable to any matrix inlet via a single unique path and a plurality of links, each being connected between a single module outlet and a single grid outlet, a path finding system for interconnecting a marked grid inlet with a single one of one or more marked matrix inlets comprising:

first scanning means for identifying a link having an available path to the marked grid inlet and to at least one marked matrix inlet;

second scanning means for selecting a marked matrix inlet having an available path to the identified link, and circuit means for applying an energizing potential to the marked grid inlet and selected matrix inlet via the identified link.

19. The path finding system of claim 18 wherein the plurality of links are arranged in cables, each link in the same cable being connected between the same input and output grids and said first scanning means includes a first scanner for identifying a cable having a link with an available path to the marked grid inlet and a link with an available path to at least one marked matrix inlet and a second scanner for identifying a link in the identified cable having both available paths.

20. The path finding system of claim 19 wherein said first scanning means includes recycle means for enabling said first scanner to search for another cable in response to a signal from said second scanner indicating that a link having both available paths cannot be found.

21. The path finding system of claim 18 including grid identification means for identifying the input grid having a marked grid inlet to enable the scanning pulses from said first scanning means to be applied to links therein.

22. The path finding system of claim 21 wherein said grid identification means includes a plurality of grid selector circuits, each being connected between said first scanning means and the links of a different one of the input grids to be enabled to pass scanning pulses therebetween in response to a signal from its connected input grid when a grid inlet thereof is marked.

23. The path finding system of claim 19 including a plurality of grid selector circuits, each being connected between said first scanning means and the links of a different one of the input grids to be enabled to pass scanning pulses therebetween from said first scanner in response to a signal from its connected input grid when a grid inlet thereof is marked.

24. The path finding system of claim 23 wherein each grid selector circuit includes a plurality of cable selector means, each being connected between said second scanner and the links of a different one of said cables within its respective grid to be enabled to pass scanning pulses therebetween in response to a signal from said first scanner when its connected cable has been identified.

25. The path finding system of claim 19 including module identification means for identifying the module to which the identified link is connected.

26. The path finding system of claim 25 wherein the modules of each output grid are arranged in groups, each group having the same number of consecutively numbered modules and the cables connected to that output grid are arranged in as many groups as there are groups of modules with each cable having as many consecutively numbered links therein as there are modules in a group so that each group of cables is associated with a module group and each link in a cable is connected to an outlet of the same numbered module in its associated module group.

27. The path finding system of claim 26 wherein said module identification means includes a plurality of group selector circuits, each being connected between said second scanning means and the inlets of a different one of said module groups to be enabled to pass scanning pulses therebetween in response to a cable identification signal from said first scanning means when one of the cables connected to its respective module group has been identified and circuit means responsive to a signal from said second scanner for applying the scanning pulses to the inlets of the module having the same number as the identified link.

28. The path finding system of claim 27 wherein each cable includes a cable identification lead connected between the group selector circuit of its associated module group and said first scanning means and said cable identification signal is applied to the identification lead of the identified cable.

29. The path finding system of claim 27 wherein said second scanning means includes a third scanner for identifying an inlet of the identified module having an available path to at least one marked matrix inlet.

30. The path finding system of claim 29 including matrix identification means for identifying the matrix to which the identified inlet is connected.

31. The path finding system of claim 30 wherein the matrices and the inlets of each module in each output grid are consecutively numbered, with each module inlet being connected to an outlet of the same numbered matrix and said matrix identification means includes a plurality of matrix selector circuits, each being connected between said third scanning means and the inlets of a different one of the matrices to be enabled to pass scanning pulses therebetween whenever any one of the group selector circuits connected to its respective output grid is enabled and said third scanner has identified a module inlet having the same number.

* * * * *